Sept. 5, 1939.    E. G. LODGE    2,172,011
FRICTION CLUTCH RHEOSTAT
Filed May 7, 1937
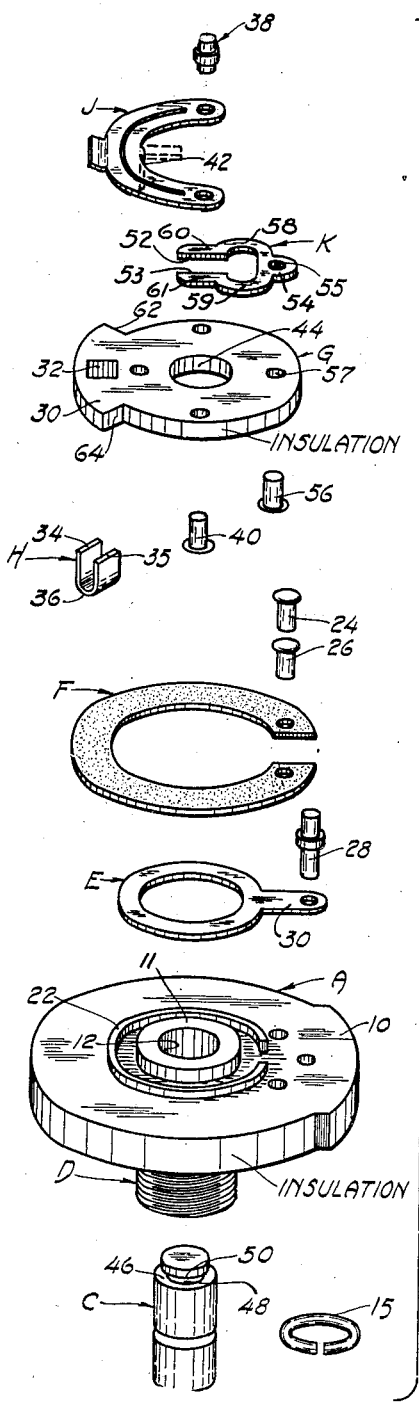
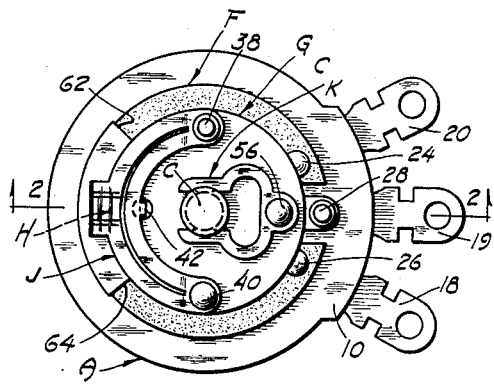
Fig. 1
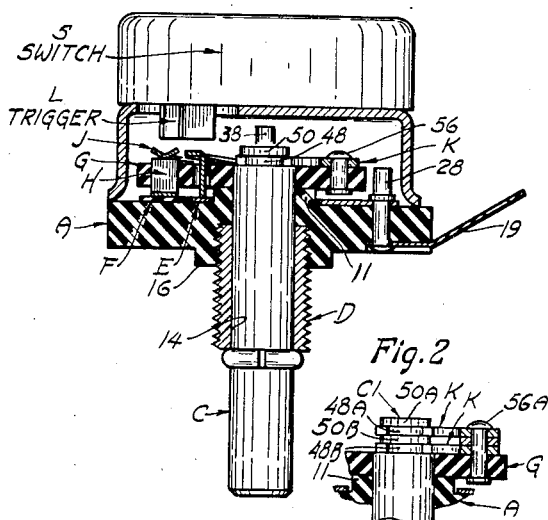
Fig. 2
Fig. 3
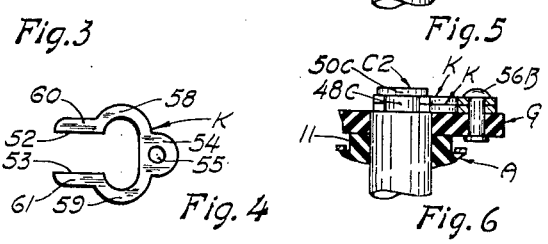
Fig. 4    Fig. 5    Fig. 6
INVENTOR
Edmund G. Lodge
BY Harry Langsam
ATTORNEY Patented Sept. 5, 1939

2,172,011

UNITED STATES PATENT OFFICE 2,172,011

FRICTION CLUTCH RHEOSTAT

Edmund G. Lodge, St. Marys, Pa., assignor to The Stackpole Carbon Company, St. Marys, Pa., a corporation of Pennsylvania Application May 7, 1937, Serial No. 141,275

2 Claims. (Cl. 64—30)

My invention relates to a variable resistance device or rheostat, and relates particularly to a friction clutch adjustable resistance device employed in radio receiving circuits.

In the ordinary type of volume control, the control shaft is limited in rotary movement in either the clockwise or counterclockwise direction because the shaft is rigidly attached to the control head. Occasionally, an excessive turning moment of force is applied to the shaft, and the internal mechanism of the volume control is damaged. To prevent any damage being done to the internal mechanism of the volume control, a friction clutch is operatively connected between the control head and the control shaft of the volume control. Then when an excessive torque or turning moment of force is applied to the control shaft, the control shaft will slip with respect to the other mechanisms of the volume control. Hence, the rotatable control shaft may be rotated constantly in either direction without injuring the control head, the resistance element, or the resistance element contact shoe.

In the prior art friction clutch rheostats, the starting torque and the turning torque differ—the starting torque usually being twice as large as the turning torque. In my present invention, the turning torque and the starting torque are approximately the same.

It is also customary for purchasers of friction clutch rheostats to specify the torque in inch-ounces, and difficulty has been experienced to meet the specifications as the values of the specified torque are very low varying from four to ten inch-ounces. By my invention the turning torque may be easily controlled to meet the specification requiring very low turning torque values from four to ten inch-ounces.

In the prior art devices, the frictional engaging surfaces usually have been of different materials, that is:—one surface would be of metal, and the other surface of Bakelite. These surfaces when moved against one another resulted in causing minute indentations or impressions which resulted in inefficient operation of the unit. In my present invention, the frictional engaging surfaces are the same; more specifically, one metallic surface frictionally engages another metallic surface.

It is, therefore, an object of my invention to provide a friction clutch in a rheostat so that the turning torque value where slippage occurs of the friction clutch may be controlled.

Another object of my invention is to provide a friction clutch rheostat where the frictional engaging surfaces are of the same material.

Another object of my invention is to provide a friction clutch rheostat where a number of elements employed are minimized.

A further object of my invention is to utilize a friction clutch spring pin to hold the control head of a friction clutch rheostat in cooperative relationship with the rotatable control shaft so that the spring pin serves a dual purpose.

A further object of my invention is to simplify the construction of the friction clutch used between the resistance element contact shoe control head and the rotatable control shaft of the volume control.

A still further object of my invention is to construct a volume control unit actuated from a single control shaft having a friction clutch disposed between the rotatable control shaft and the control head.

Other objects of my invention are to construct an improved device of the character described which is readily and economically produced, that is sturdy in construction and which is highly efficient in operation.

With the above and related objects in view, my invention consists in the details of construction and combination of parts, as will be more fully understood from the following description, when read in conjunction with the accompanying drawing, in which:

Fig. 1 is a plan view of a volume control or adjustable resistance device embodying my invention.

Fig. 2 is a fragmentary sectional view of the adjustable resitance unit embodying my invention coupled with a snap switch wherein both the adjustable resistance device and snap switch are actuated by the single control shaft. The section through the rheostat is that as taken on the line 2—2 of Fig. 1.

Fig. 3 is an exploded view of the essential elements embodied in my invention.

Fig. 4 is a plan view of the spring pin member of the clutch.

Fig. 5 is a fragmentary side view showing a modification of my invention utilizing two spring pins in the friction clutch.

Fig. 6 is a fragmentary side view showing another modification of my invention.

Referring now in detail to the drawing, I show a friction clutch embodied within a rheostat, volume control, or adjustable resistance device comprising a molded base, generally designated as A, of insulating material such as material known under the trade-mark "Bakelite". The base is substantially a disc-like member having one or more peripheral extensions 10 thereon, which position a metallic casing or shell B, and the base also has a small central annular boss 11 which has a central aperture through which a control shaft, generally designated as C, extends. Defining the central aperture is a cylindrical bore 12 of a diameter slightly larger than the diameter of the shaft C. A hollow externally threaded shaft bushing D is suitably mounted with respect to the base so that the bore 14 of the bushing D is aligned with the central bore 12 of the base A. This arrangement enables the shaft to be journaled on each of the bores of the bushing and of the base. The bushing holds the entire volume control on the mounting panel (not shown) by means of a lock-nut—this is the well-known single control volume mounting.

A lock washer 15 fits into a groove on the shaft C, and the washer 15 abuts against the end of the bushing D to limit movement of the shaft C in one direction.

A boss 16 is integrally formed with the outside flat surface of the base A so that the annular flat surface of the boss 16 abuts against the mounting panel (not shown) to space the volume control from the mounting panel. This arrangement precludes the fixed outside electrical terminals 18, 19 and 20 from being short-circuited when the unit is mounted upon a metallic panel. Upon the inner surface of the base is a smaller circular boss 22. The boss 22 serves to limit side movement of a stationary electrical collector ring, generally designated as E, and the boss also serves to prevent side movement of a paper coated carbonaceous resistance element, generally designated as F. The resistance element may have a tapered coating thereon so that the specific resistance per unit of length will be variable. The manner of attaching the stationary slip ring E and the resistance element to the base A will not now be described in detail, but for a more specific explanation of the details of construction, reference is made to a patent to C. J. Hathorn, No. 2,069,440, granted February 2, 1937. The resistance element, however, is held to the base A and to the outside terminals by holding rivets 24 and 26; and a combined stop pin and holding rivet 28 holds the tab 30 of the slip ring E to the base and also electrically joins the slip ring E to the outside terminal 19. One end of the resistance element F is connected to the left-hand terminal 18, and the other end of the resistance element is connected to the right-hand terminal 20.

A control head, generally designated as G, is substantially of disc-like formation, and it has an extension 30 which extends in the same plane as the major portion of the insulator control head G. The extension 30 of the control head has an opening 32 therein which complementary receives a resistance element contact shoe, generally designated as H. The metallic contact shoe H has two parallel legs 34, 35 which are deformable in that they may be pressed together in order to enable the lower contact surface 36 of the contact shoe to ride in engagement with the conducting material on the resistance element F.

It should be apparent that the value of the resistance between the low resistance end of the resistance element and the central terminal will be dependent upon the location of the contact shoe H from the right-hand or low resistance terminal 20. In other words, the derived resistance circuit may be between the terminal 20 which for purposes of reference will be designated as the low resistance terminal and the contact shoe H. As the contact shoe H moves away from terminal 20, the value of the resistance between the terminals 20 and 19 will increase; and when the contact shoe H approaches the terminal 20, the value of the resistance between the terminals 18 and 19 will be decreased.

A pressure arm, generally designated as J, mounted on the control head G presses on a portion of the upper surface of each of the legs 34, 35 of the contact shoe H so there will be a pressure engagement of the contact shoe with the resistance element F. The pressure arm J is supported so that it is flexible and is held in position by rivets 38 and 40. The pressure arm J may have an extension 42 integrally stamped therefrom so that the extension will frictionally slide in engagement with the stationary contact ring E, whereby the current collected by the contact shoe H will pass through the pressure arm J, the extension 42, and the collector ring E, and then to the outside terminal 19.

The control head G has a central bore 44 which is of substantially the same diameter as the diameter of the control shaft C. The control head G is thus enabled to rotate freely with respect to the control shaft C.

From the shoulder 46 of the control shaft C is a cylindrical friction extension 48 of smaller diameter than the shaft C; and from the cylindrical friction extension extends another shoulder 50 which is of a greater diameter than the extension 48. The cylindrical surface 48 serves as a driving frictional surface which frictionally engages the frictional surfaces 52, 53 of the spring friction pin, generally designated as K.

The friction pin K has a head 54 in which there is a suitable opening 55 so that a suitable holding rivet 56 may pass through the opening 55 and an opening 57 in the control head G; and when the end of the rivet 56 is peened over, the pin K and the control head G will be rigidly secured together. From each end of the head 54 of the friction pin K are semi-circular spring-like connecting portions 58 and 59, and from the other end of the semi-circular connecting portions are parallel legs 60, 61 on which are the frictional engaging surfaces 52, 53, respectively. These frictional driven surfaces have hereinbefore been described in connection with the control shaft frictional driving surface 48. It should be noticed that the leg 60 is spaced from the head 54 so that there is a limited degree of resiliency. The leg 61 is likewise resilient with respect to the head 54.

It should also be noticed that the holding rivet 56 is located near the periphery of the control head so that the frictional surfaces of the pin will be in engagement with the driving frictional surface of the control shaft. Hence, as the turning moment is completed to the control shaft C, the frictional surface 48 frictionally engages the surface 52, 53 of the friction pin K causing a turning couple. This turning couple is sufficiently strong to move the pin K and the control head G, and since the pin and the control head must move in unison, the contact shoe H must also move in engagement with the resistance element. The rotation of the contact shoe H on the resistance element in a clockwise direction as Fig. 1 is viewed is limited by the outer edge 62 of the control head abutting the stop pin 28. The contact shoe H is limited in movement in a counterclockwise direction by the edge 64 abutting the stop pin 28 as Fig. 1 is viewed. Hence, the contact shoe and its control head can only be moved a limited distance which is less than 360°.

Let us assume for the purposes of illustrating the invention that the shaft C is rotated clockwise as Fig. 1 is viewed so that the edge 62 engages the stop pin 28. The control shaft C may be rotated any number of times in a clockwise direction without moving the contact shoe and without injuring any of the mechanism which has hereinbefore been described. If the direction of rotation of the control shaft is reversed, that is so that it moves in a counterclockwise direction as Fig. 1 is viewed, then the control head and its contact shoe will be moved counterclockwise; and if the rotation is continued in a counterclockwise direction, then the edge 64 will abut the stop pin 28, and the contact shoe will be limited in its movement in a counterclockwise direction. The control shaft, however, can be continuously rotated in a counterclockwise direction without injuring the mechanism as the friction clutch will slip, and it may be immediately reversed in a direction to move the control head and the contact shoe H—the friction clutch will also slip in the opposite direction when the torque becomes excessive.

The combined rivet and cam 38 are also adapted to engage the forked trigger L of the snap switch S. This manner of operating a snap switch and control shaft is also explained in detail in a patent to C. J. Hathorn No. 2,057,829, granted October 20, 1936. This operation of the snap switch occurs at a predetermined portion of the movement of the control shaft and sufficient frictional force from the friction clutch is transmitted to actuate the snap switch either when the switch is to be closed or whether it is to be opened.

Under certain conditions, it may be desirable to increase the turning moment, and that is achieved by duplicating the friction clutch mechanisms which may be by having two frictional driving surfaces and two frictional driven pin units as illustrated in Figs. 5 and 6.

In Fig. 5 the control shaft C1 has at its end two frictional cylindrical surfaces 48A and 48B. The surfaces 48A and 48B are separated by a spacer or enlarged member 50B and the end of the shaft has an end head 50A. Two spring pins K, K of the identical construction as the friction clutch pin K illustrated in Fig. 4 serve as part of the friction clutch. A single holding rivet 56A retains the clutch pins K, K rigidly to the control head G. A small washer, the thickness of the shoulder or spacer 50B, may be positioned between the heads of the clutch pins K, K to properly space the pins apart.

As another modification of my invention, I show two friction clutch units in Fig. 6. The shaft C2 has a cylindrical frictional driving surface 48C and an enlarged outer head 50C. The driving surface 48C is of the same thickness as two of the pins K, K, and the frictional force of surface 48C on the frictional surface of the clutch pins K, K drives the control head G. A holding rivet 56B passes through the head openings in the clutch pins K, K and an opening in the control head G.

It should be particularly observed that when the friction clutch pin K is assembled into position on any of the units illustrated in Figs. 2, 5 and 6, the pin K not only serves as a friction clutch whereby the control shaft may slip with respect to the control head, but the pin K prevents the control head G from moving in either direction along the longitudinal axis of the control shaft. This locking of the control head G to the control shaft is brought about the mechanical attachment of the rivet 56 holding the pin K to the control head and the extensions or shoulders on the control shaft overlapping the ends of the friction clutch pin K. The boss 11 on the base only limits movement of the control shaft in one direction along its longitudinal axis as the C or split washer 15 limits the movement of the control shaft in the opposite direction.

I may, however, embody in this invention the Archimedes spiral wire which directly connects the contact shoe to one of the outside terminals and which is described in considerable detail in my patent application filed April 19, 1937, Serial No. 137,680.

Although my invention has been described in considerable detail, such description is intended as illustrative rather than limiting, since the invention may be variously embodied, and the scope of the invention is to be determined as claimed.

I claim as my invention:

1. A metallic friction clutch member for use in an adjustable resistance device, comprising a head adapted to be secured to a driven member, and a pair of spaced legs integral with said head projecting laterally in the same general direction therefrom, the inner end portions of said legs being substantially straight and parallel and being connected to said head by resilient portions curved laterally away from each other, whereby said inner end portions of the legs are adapted to frictionally grip a driving member for normally transmitting rotative movement from a driving member to a driven member.

2. A friction clutch for use in an adjustable resistance device, comprising a driving shaft provided with a peripheral recess the inner wall of which is cylindrical, and a one-piece clutch member having a head adapted to be secured to a driven member and having a pair of spaced resilient legs integral with said head projecting laterally in the same direction therefrom, the innermost ends of the legs being spaced apart, and the inner end portions of said legs straddling said shaft and frictionally gripping the cylindrical wall of said recess for normally transmitting rotative movement from the shaft to said driven member.

EDMUND G. LODGE.